United States Patent [19]
Mandel

[11] Patent Number: 5,568,306
[45] Date of Patent: Oct. 22, 1996

[54] LASER BEAM CONTROL AND IMAGING SYSTEM

[75] Inventor: Victor Mandel, Huntington Beach, Calif.

[73] Assignee: Leonard Tachner, Newport Beach, Calif.

[21] Appl. No.: 323,667

[22] Filed: Oct. 17, 1994

[51] Int. Cl.$^6$ ............................................. G02B 26/08
[52] U.S. Cl. ...................... 359/223; 359/196; 359/212; 359/634
[58] Field of Search ............................ 359/196, 201, 359/214, 219, 220, 221, 399, 589, 212, 223, 225, 226, 363, 634; 250/201.2, 201.4, 234–236; 346/108, 160

[56] References Cited

U.S. PATENT DOCUMENTS

| | | | |
|---|---|---|---|
| 4,237,492 | 12/1980 | Roth et al. | 359/629 |
| 4,353,617 | 10/1982 | Tokumitsu et al. | 359/221 |
| 4,376,303 | 3/1983 | Lurie | 369/45 |
| 4,499,897 | 2/1985 | Roussel | 606/6 |
| 4,526,447 | 7/1985 | Taylor | 359/196 |
| 4,974,919 | 12/1990 | Muraki et al. | 359/204 |
| 5,071,235 | 12/1991 | Mori et al. | 359/692 |
| 5,124,539 | 6/1992 | Krichever et al. | 359/221 |
| 5,138,486 | 8/1992 | Meyer et al. | 359/363 |
| 5,220,450 | 6/1993 | Iizuka | 359/216 |
| 5,241,419 | 8/1993 | Pratt et al. | 359/634 |

FOREIGN PATENT DOCUMENTS 1065820  1/1984  U.S.S.R. ................................. 359/839

Primary Examiner—Paul M. Dzierzynski
Assistant Examiner—Darren E. Schuberg
Attorney, Agent, or Firm—Leonard Tachner

[57] ABSTRACT

A laser beam control and imaging system having opto-mechanical components for shaping and directing the beam of a laser and for observing light reflected or generated as a result of the laser impinging upon an object. A preferred embodiment of the invention is shown for use with infrared lasers which may be used to heat an object or to provide an additional heating source for melting selected portions of an object, such as melting pure silicon for crystal growth thereof in the manufacture of semiconductor materials. The disclosed configuration of the present invention provides for selecting the focal length and shape of the beam of the laser and for angularly directing the laser beam relative to two mutually orthogonal directions, as well as translating the position of the beam relative to the object to be heated. In addition, the present invention provides components for viewing the light reflected from the object or generated light resulting from the heating of the object, thereby indicating the precise location of the point of the beam as it impinges on the object's surface which permits precise aiming of the beam to impinge on the object at the desired point. The light imaging system comprises both telescope viewing and video imaging.

14 Claims, 1 Drawing Sheet

LASER BEAM CONTROL AND IMAGING SYSTEM

BACKGROUND OF THE INVENTION

1. Field of the Invention

The present invention relates generally to opto-mechanical beam control systems and more specifically to a laser beam control system that may for example be advantageously used with a laser employed as an adjunct to a heater for the melting of silicon in a controlled fashion for semiconductor crystal growth.

2. Prior Art

The use of lasers as a source of heat in growing crystals from a melt for the fabrication of semiconductor crystals is described generally in a paper by the present inventor. This prior art is entitled "GROWTH OF SINGLE CRYSTALS OF SEMICONDUCTORS BY ZONE MELTING WITHOUT A CRUCIBLE WITH LASER HEATING", published in the Soviet Physics Crystalography Journal, March–April, 1991, pages 281 and 282. This paper discusses the use of laser heating in crystal growth processes where there is a necessity for additional local heating in addition to a main source, such as an induction heating device. There is disclosed the use of an optical mechanical device fixed to the emitter of the laser and enabling one to focus the laser radiation to move the focal spot over a heated object and to effect continuous monitoring of the aiming of the invisible infrared beam at a given point on the heated object. The focal spot of the laser beam may be altered by moving a focusing objective lens in two mutually perpendicular directions in a plane perpendicular to the beam. Self-generated or reflected radiation from the heated object is directed into a dioptric tube with the aid of a plane parallel spectral divider mirror, transparent at the laser wavelength of 1.06 micrometers and fixed obliquely between the laser and the focusing objective lens. This permits an image of the heated object to be formed in the focal plane of the eyepiece of the dioptric tube, allowing an eyepiece cross-wires to be used to indicate the point of incidence of the laser beam on the object.

In an earlier paper entitled "APPLICATION OF LASER AND INDUCTION HEATING FOR SEMICONDUCTOR CRYSTAL GROWTH", by the inventor and a co-author V.I. Dobrovolskaya published in the Russian language in Elektrotekhnika, Volume 58, No. 12, pages 16–19, 1987, there is a more detailed description of the same optomechanical beam control system for accomplishing the aforementioned laser beam control for heating. As this paper describes, such a beam control system should focus the laser radiation and permit one to change the focal point position along the beam centerline. This feature is particularly important when growing crystals of various diameters. Such a beam control system should also allow one to direct the laser beam during the growth process into a selected point of the object to overcome the prior art limitation where this function has been traditionally solved by displacing the object, such as by means of a coordinate position table. Such a solution in the prior art would be difficult or impossible to carry out with a growing crystal.

As shown in FIG. 1 of the 1987 article by Dobrovolskaya and Mandel, the beam control system disclosed therein comprises a lens which is mounted for displacement along the beam centerline to provide shifting of the focal point. Furthermore, the lens is displaceable in two perpendicular directions in a plane perpendicular to the laser beam which enables deflecting the beam to the selected point of the object. This same lens also receives the self-generated or reflected radiation from the object which is passed to a plane parallel plate, a turnable mirror, a light filter and a telescope. This prior art optical train unfortunately has a number of disadvantages. One such disadvantage is that the lens used to control the position of the beam where it is incident on the crystal being grown, does not provide satisfactory accuracy in beam control, particularly when one considers that this lens is also relied on to vary the focal point of the laser beam by translation along the direction of the beam. Furthermore, movement of the lens either along the beam of the laser or perpendicular thereto to control the focal point and position of the point of incidence on the object, may detrimentally affect the imaging accuracy of the radiation of the heated object and thus decrease the accuracy with which one can observe the effect of the laser during the operation. This disadvantage is particularly significant with respect to translation of the lens for laser beam focal point control since such translation may affect the imaging capability of the lens with respect to the reflected light in which there is no compensation in the lens or any other portion of the light monitoring system of the beam control unit. Also significant is the fact that by limiting the control of the focal point of the laser by only a single lens, one loses a degree of control flexibility that would be available with a more complex lens configuration. However, by increasing the complexity of the lens configuration of the focal point control using the optical train of the prior art, one would incur the increased difficulty of maintaining an accurate and precise image of the light emission and/or reflection of the heated object. Furthermore, there is an inherent difficulty in using remote control of laser beam parameters and monitoring parameters concurrently.

Accordingly, there is a continuing need for an improved beam control system which permits more flexible control of laser beam parameters, including shape, sharpness and focal point, without detrimentally affecting the imaging portion of the system so that precise positioning and shape, sharpness and focal point control of the beam can be obtained without losing the efficacy of the light imaging needed to monitor and control the position of the laser beam precisely.

SUMMARY OF THE INVENTION

The present invention solves the aforementioned need by providing a beam control system such as for a laser beam heating application for semiconductor crystal growth as disclosed in the prior art, but which utilizes a novel optical implementation in which shape, sharpness and focal length control of the beam may be effected without interfering in any manner with the light imaging of the incident point of the beam on the object. Furthermore, in the present invention the control of the beam position is implemented using a mirror which may be rotated in two directions about mutually perpendicular axes and which may also be translated to displace the beam along the object being heated, thus providing an added degree of adjustability of the beam that is not available in the aforementioned prior art. Furthermore, it will be seen hereinafter that the present invention provides an added capability also not disclosed in the prior art, namely the ability to provide both telescope imaging and video imaging of reflected or self-generated light which further increase the safety characteristics of the present invention and provides for a magnification of the object. Video imaging also provides a brighter image and is more conducive to remote control, automation and general convenience. Such magnification can be especially useful for more precise control and accuracy of the position and shape of the beam as it impinges on the object. In one embodiment of the invention, the laser light wavlength is 1.064 μm and the imaging light wavelength is in the range of 0.4 μm to 0.7 μm.

Thus, in the present invention, the imaging characteristics thereof are made more accurate and precise by a reduction in the interaction between the optical components used to control the laser beam position and the optical components used to provide images of the object. Furthermore, it will be seen that in the present invention, there is a significant advantage derived from improved control of the beam position, as well as a more sophisticated control of the beam shape, sharpness and focal point.

OBJECTS OF THE INVENTION

It is therefore a principal object of the present invention to provide a beam control system for use with lasers and particularly for use with infrared lasers to provide heating of an object such as heating of a semiconductor material for growth of crystals thereof.

It is an additional object of the present invention to provide an improved beam control system for use with lasers for the control of the beam position thereof, wherein the shape, sharpness and focal point of the beam, as well as the position of the beam relative to a target may be independently controlled by separate optical components.

It is still a further object of the present invention to provide a beam control system having means for controlling the position of the beam relative to an object to be heated thereby and for imaging the heated beam impact point for determining the accuracy of the beam control, the imaging components and the beam control components being substantially independent to permit accurate imaging and accurate beam control without one affecting the other to any significant extent.

It is still an additional object of the present invention to provide a beam control system for a laser beam directed onto a distant object and employing an imaging system operating at a different wavelength and providing imaging by either a telescope or a video camera or both.

It is still an additional object of the present invention to provide a laser beam control and imaging system which employs virtually independent control and imaging optics to increse safety, improve laser beam characteristics, provide more flexible imaging capability and provide a system more conducive to automation and remote control.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
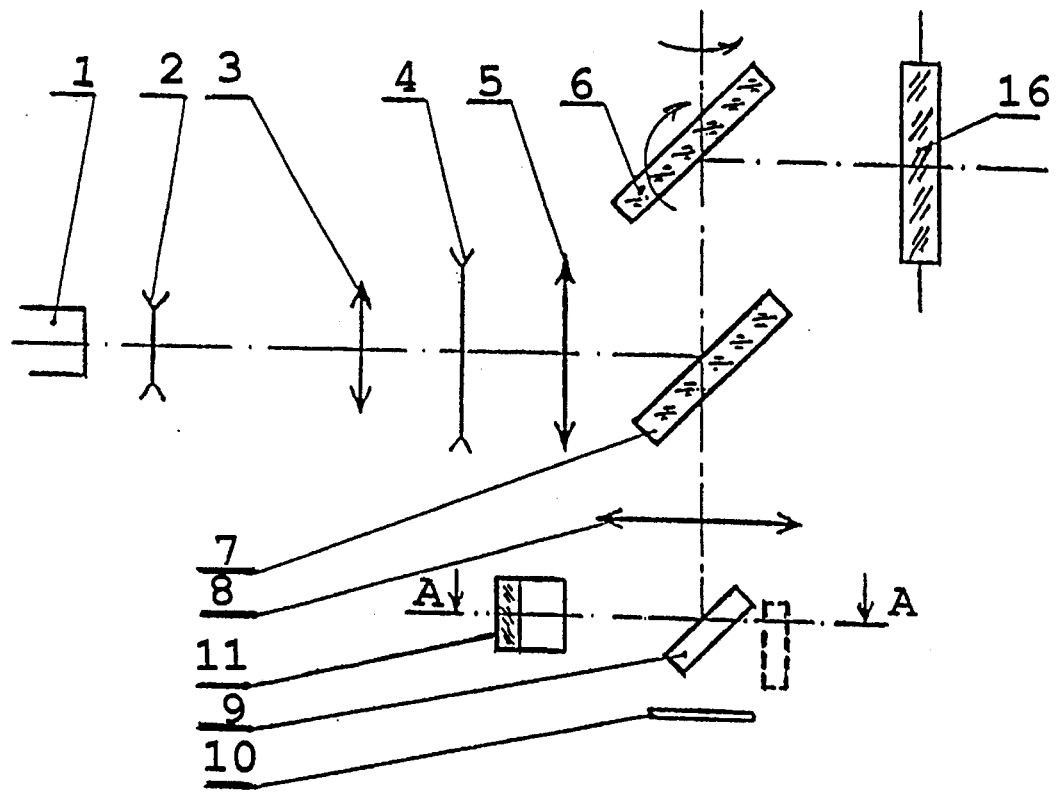
FIG. 1 is a schematic illustration of the beam control system of the present invention.

Turning now to the accompanying figures, it will be seen that there is shown therein a laser 1, a diverging lens 2 and a converging lens 3, a diverging lens 4 and a converging lens 5, a dichroic mirror 7, a two-axis rotatable mirror 6, a magnification lens 8, a moveable mirror 9 and a video camera image plane 10. Diverging lens 2 and converging lens 3 operate in conjunction with one another to widen the beam of the laser 1. Widening of the beam permits one to reduce beam divergence then focus the widened beam into a very sharp point at a longer focal point to increase the energy density at the impact point with the object to be heated by the laser beam. Divergent lens 4 and convergent lens 5, together comprise an objective optical train which is designed to alter the laser beam emanating from lenses 2 and 3, into a point by focusing the beam at a desired focal point relative to the object to be heated. Lenses 4 and 5 can be translated along the axis of the beam in order to vary the distance between the lenses 4 and 5 and thereby change the position of the focal point along the axis of the beam. This feature provides maximum optical density at the point or location on the object to generate maximum heat at that point. It will be understood that other optical devices, equivalent to the above-described lens systems, may be used instead to shape, sharpen and select the focal length of the beam.

The beam emanating from objective lenses 4 and 5 is then incident on dichroic mirror 7 which is designed to provide virtually 100% reflection at the wavelength of the laser beam energy so that virtually all of the laser beech energy is reflected toward a mirror 6. Mirror 6 is the device used to control the reflected laser beam so that it impinges on a selected location of the object after it passes through a transparent window 16 shown in the upper right-hand corner of FIG. 1. Mirror 6 is preferably rotatable about two orthogonal axes as shown in FIG. 1 by the two arrowheads adjacent mirror 6. In addition, mirror 6 is preferably translatable along the axis of the laser beam in a direction toward or away from mirror 7, thus permitting the laser beam to be displaced vertically as seen in FIG. 1. By combining this translation capability with a dual axis rotation capability, mirror 6 provides means for precise control of the direction and location of the laser beam through the window 16 and onto the object to be heated by the laser energy. Mirror 6 is preferably 100% reflective at the wavelength of laser light and significantly reflective at the wavelength of imaging light, so that virtually all the laser energy is reflected toward the object and a significant fraction of the light from the object or generated by the heating of the object is reflected from the mirror 6 toward mirror 7. Mirror 6 and mirror 7 are both preferably glass mirrors covered by thin dielectric layers. The number and thickness of dielectric layers is selected to provide the desired reflection and transmission characteristics so that mirror 6 is 100% reflective to the selected laser and significantly reflective to imaging light, while mirror 7 is substantially 100% reflective to laser light and substantially transparent at the wavelengths of the imaging light. In this fashion, the light reflected by the object or generated by heating of the object, is transmitted back along the beam path through the window 16 and is incident upon the rotatable and translatable mirror 6 and passes through the mirror 7 because of the latter's relatively high transparency to the imaging light.

This imaging light is incident upon a magnification lens 8, which functions as the objective lens for either focusing the imaging light onto a mirror 9, which is a glass, silver-coated mirror or onto a video camera focal plane 10, which is behind the mirror 9 and which receives the imaging light when the mirror 9 is moved from the position shown in solid line in FIG. 1 to the position shown in dotted line in FIG. 1. When the mirror 9 is in its solid line configuration shown in FIG. 1, the imaging light is reflected therefrom and it impinges on a second mirror 11, the function of which will be understood hereinafter in conjunction with FIG. 2 which will now be discussed.

Figure 2:
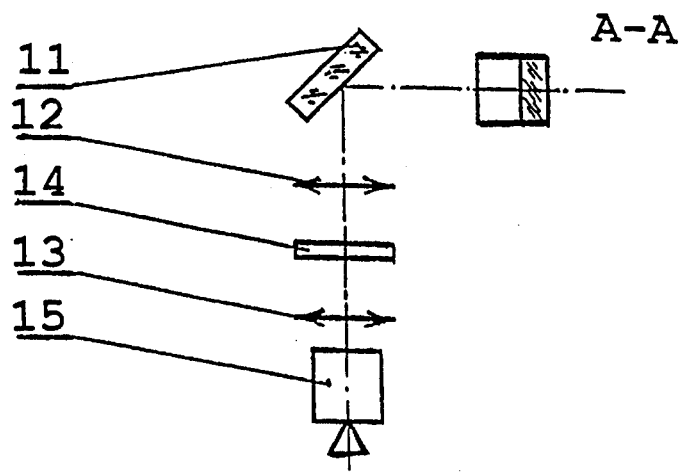
FIG. 2 is a schematic diagram similar to that of FIG. 1, but illustrating imaging components thereof.

As shown in FIG. 2, the imaging light reflected by mirror 11, passes through a lens 12, a filter 14 and a lens 13 before reaching a telescope 15. Lenses 12 and 13 act as additional objective lenses to invert the imaging light image so that it can be seen in its proper orientation through the telescope 15. The filter 14 provides infrared absorption to protect against infrared energy from the object being heated and being observed by the beam control system of the present invention. Thus, the eye of the observer looking through telescope 15 is protected both by the infrared reflective characteristic of dichroic mirror 7, as well as by the infrared absorbing characteristic of filter 14. Thus, it will be seen that the position of mirror 9 provides two imaging options for viewing the precise point of impingement of the laser beam on an object to be heated. More specifically, when the mirror 9 of FIG. 1 is positioned in its solid line configuration, imaging light is reflected into the telescope 15 which may then be used to observe the location of the heated spot where the laser beam is impinging upon the object being heated. However, when the mirror 9 is rotated into the dotted line location shown in FIG. 1, the imaging light is incident on the video camera 10, which may be used as an alternative viewing apparatus.

Thus, it will be seen that the present invention provides a number of significant advantages as compared to the prior art. First and foremost, there is no need to move the object in order to vary the location at the point of incidence of the laser beam on the object to be heated. Secondly, variation of the shape, sharpness and focal point of the laser beam is totally independent of the imaging light optics, thereby allowing absolute independence and freedom of beam parameter variation without potentially affecting the accuracy of the object imaging. Most importantly perhaps, the present invention provides a significant increase in the degree of beam motion control by utilizing a beam control mirror which may be rotated about two mutually perpendicular axes such as for example to provide both elevation and azimuth control of the beam. The mirror 6 is preferably mounted in a frame having a mounting for rotation around two axes. In addition, mirror 6 is preferably mounted in a frame which is translatable so that the point of reflection may be varied along the axes of the beam, thereby permitting further control of the beam location at the object. Still another significant advantage of the present invention is its light imaging characteristics. More specifically, in the present invention, imaging light can be observed by a telescope or can be made incident on the focal plane of a video imaging device such as CCD television or the like. Calibrating cross-wires may be used to further improve beam aiming accuracy.

It will now be understood that what has been disclosed herein comprises a laser beam control system having opto-mechanical components for shaping and directing the beam of a laser and for observing light reflected from or generated as a result of the laser impinging upon an object. A preferred embodiment of the invention is shown herein for use with infrared lasers which may be used to heat an object or to provide an additional heating source for melting selected portions of an object, such as melting pure silicon for crystal growth thereof in the manufacture of semiconductor materials. A novel configuration of the present invention provides means for shaping the beam of the laser and for angularly directing the laser relative to two mutually orthogonal directions, as well as translating the position of the beam relative to the object to be heated. In addition, the present invention provides imaging components for viewing reflected light or light generated resulting from the heating of the object, thereby indicating the precise location of the point of the beam as it impinges on the object's surface. A light imaging system comprising both telescope viewing and video viewing of the imaging light is disclosed. The latter is particularly suited to automated or remote control of the laser beam in virtually any application where the precise position of the beam on a distant object is critical.

Those having skill in the art to which the present invention pertains, will now as a result of the applicant's teaching herein, perceive various modifications and additions which may be made to the invention. By way of example, the precise nature of the lenses disclosed herein for modifying the beam characteristics, may be readily altered and substituted with other forms of optical devices capable of carrying out the same function. A Cassegrain mirror configuration may be used to control beam characteristics. The laser need not be operated at any specific wavelength or level of power; and it may be intended for many industrial or scientific applications. Furthermore, the structure of mirrors and imaging components disclosed herein, may be readily altered. Accordingly, all such modifications and additions are deemed to be within the scope of the invention which is to be limited only by the claims appended hereto and their equivalents.

I claim:

1. An improved laser beam control and imaging apparatus of the type used for varying the focal point and direction of a laser beam and for aiming the laser beam on an object by providing an image of the point of impingement of the beam on the object; the apparatus comprising:

a laser beam source;

a first lens system for controlling the shape of the laser beam;

a second lens system for controlling the focal point of the laser beam;

a first mirror for reflecting the laser beam but for transmitting light from the object;

a second mirror for reflecting the laser beam and light from the object, said second mirror being moveable for altering the direction of said reflected laser beam;

said first and second lens systems and said first and second mirrors directing the laser beam toward a selected location on said object to impinge said laser beam on said location over a selected size impingement point; and an imaging system positioned relative to said first and second mirrors for receiving said light from said object which indicates the precise position of the laser beam on the object;

said first and second lens systems being positioned between said laser beam source and said first mirror.

2. The apparatus recited in claim 1 wherein said first lens system comprises a convergent lens and a divergent lens.

3. The apparatus recited in claim 1 wherein said second lens system comprises a convergent lens and a divergent lens and wherein at least one of said lenses is moveable relative to the other of said lenses to change the spacing between said lenses.

4. The apparatus recited in claim 1 wherein said second mirror is adjustable about at least two orthogonal axes of rotation.

5. The apparatus recited in claim 4 wherein said second mirror is translatable relative to said first mirror.

6. The apparatus recited in claim 1 wherein said imaging system comprises a telescope for viewing the light from said object.

7. The apparatus recited in claim 1 wherein said imaging system comprises a video imaging device for viewing the light from said object.

8. The apparatus recited in claim 1 wherein said imaging system comprises a telescope and a video imaging device for viewing the light from said object; and a third mirror for directing said light from said object reflected by said second mirror and transmitted by said first mirror, to a selected one of said telescope and said video imaging device.

9. An improved laser beam control and imaging apparatus of the type used for varying the focal point and direction of a laser beam and for aiming the laser beam by providing an image of the point of impingement of the beam on an object; the apparatus comprising:

a laser beam source;

a first lens system for controlling the shape of the laser beam;

a second lens system for controlling the focal point of the laser beam;

a first mirror for reflecting the laser beam but for transmitting light from said object;

a second mirror for reflecting the laser beam and light from said object, said second mirror being moveable for altering the direction of a reflected laser beam;

said first and second lens systems and said first and second mirrors directing the laser beam toward a selected location on said object to impinge said laser beam on said location over a selected size impingement point; and an imaging system positioned relative to said first and second mirrors for receiving said light from said object;

wherein said first lens system comprises a convergent lens and a divergent lens;

wherein said second lens system comprises a convergent lens and a divergent lens and wherein at least one of said lenses is moveable relative to the other of said lenses to change the spacing between said lenses; and wherein said first and second lens systems are positioned between said laser beam source and said first mirror.

10. The apparatus recited in claim 9 wherein said second mirror is adjustable about at least two orthogonal axes of rotation.

11. The apparatus recited in claim 10 wherein said second mirror is translate relative to said first mirror.

12. The apparatus recited in claim 9 wherein said imaging system comprises a telescope for viewing said light from said object.

13. The apparatus recited in claim 9 wherein said imaging system comprises a video imaging device for viewing said light from said object.

14. The apparatus recited in claim 9 wherein said imaging system comprises a telescope and a video imaging device for viewing said light from said object; and a third mirror for directing said light from said object reflected by said second mirror and transmitted by said first mirror, to a selected one of said telescope and said video imaging device.

\* \* \* \* \*